(12) United States Patent
Cragun et al.

(10) Patent No.: US 8,095,556 B2
(45) Date of Patent: Jan. 10, 2012

(54) CONTROLLING MODIFICATION OF COMPONENTS IN A CONTENT MANAGEMENT SYSTEM

(75) Inventors: Brian John Cragun, Rochester, MN (US); John Edward Petri, Lewiston, MN (US); Leah Rae Smutzer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 12/101,259

(22) Filed: Apr. 11, 2008

(65) Prior Publication Data

US 2009/0259661 A1 Oct. 15, 2009

(51) Int. Cl.
*G06F 7/00* (2006.01)
*G06F 17/30* (2006.01)
*G06F 13/14* (2006.01)

(52) U.S. Cl. ......... 707/784; 707/705; 707/781; 707/783
(58) Field of Classification Search .................. 717/168; 726/28; 707/736, 713, 739, 748, 784, 783, 707/781, 705; 715/230, 238, 738
See application file for complete search history.

(56) References Cited

U.S. PATENT DOCUMENTS

| | | | | |
|---|---|---|---|---|
| 6,513,039 | B1 * | 1/2003 | Kraenzel | 707/784 |
| 7,779,347 | B2 * | 8/2010 | Christiansen et al. | 715/230 |
| 2002/0163917 | A1 * | 11/2002 | Chen et al. | 370/395.32 |
| 2004/0249943 | A1 | 12/2004 | Punaganti Venkata et al. | |
| 2006/0117391 | A1 | 6/2006 | Kim | |
| 2007/0143855 | A1 | 6/2007 | Gilchrist et al. | |
| 2007/0198532 | A1 | 8/2007 | Krikorian et al. | |
| 2007/0231335 | A1 * | 10/2007 | Beutler et al. | 424/165.1 |
| 2007/0234335 | A1 * | 10/2007 | Takahashi et al. | 717/168 |

OTHER PUBLICATIONS

U.S. Patent Application entitled "Controlling Reuse of Components in a Content Management System" by Brian John Cragun et al.

* cited by examiner

*Primary Examiner* — Cam-Y Truong
*Assistant Examiner* — Cecile Vo
(74) *Attorney, Agent, or Firm* — Martin & Associates LLC; Derek P. Martin

(57) ABSTRACT

A content management system (CMS) includes a content modification mechanism that checks a modification contract corresponding to a component in the repository, and determines if all relevant criteria in the modification contract corresponding to the component are satisfied before making changes to or allowing reuse of a component in the repository. The modification contract may specify a profile of authors that are allowed to modify the corresponding component. The content management system includes an author profile update mechanism that monitors modifications by authors to components in the repository, and automatically adjusts a profile of each author according to modifications made by the author. In this manner the rank of authors is automatically adjusted and the modification of components is controlled in a way that allows modification by those who are authorized yet restricts modification by those who are not authorized.

1 Claim, 6 Drawing Sheets

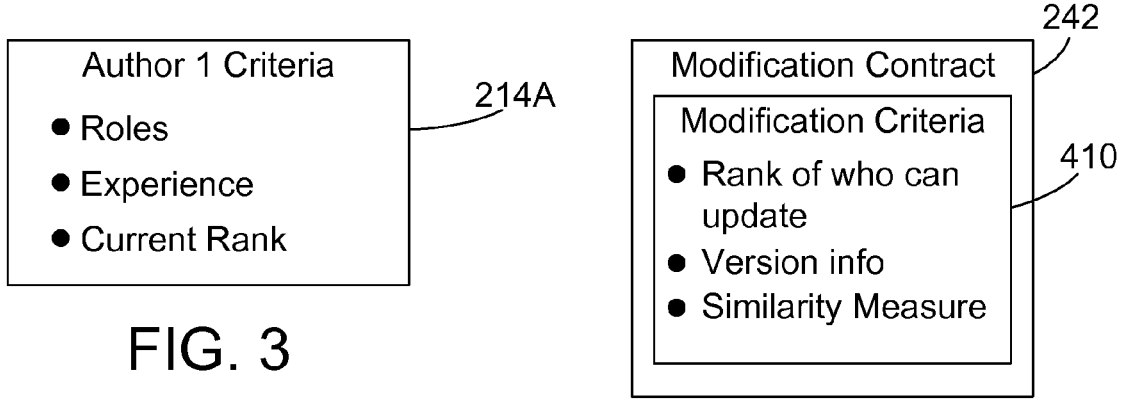
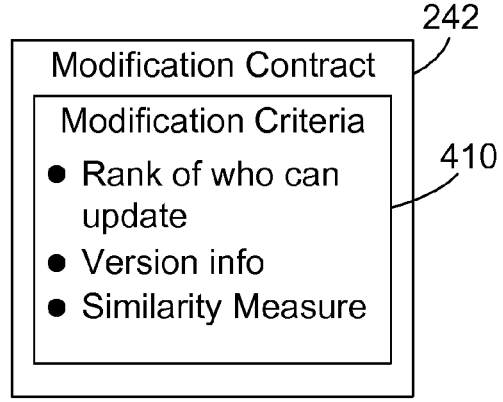
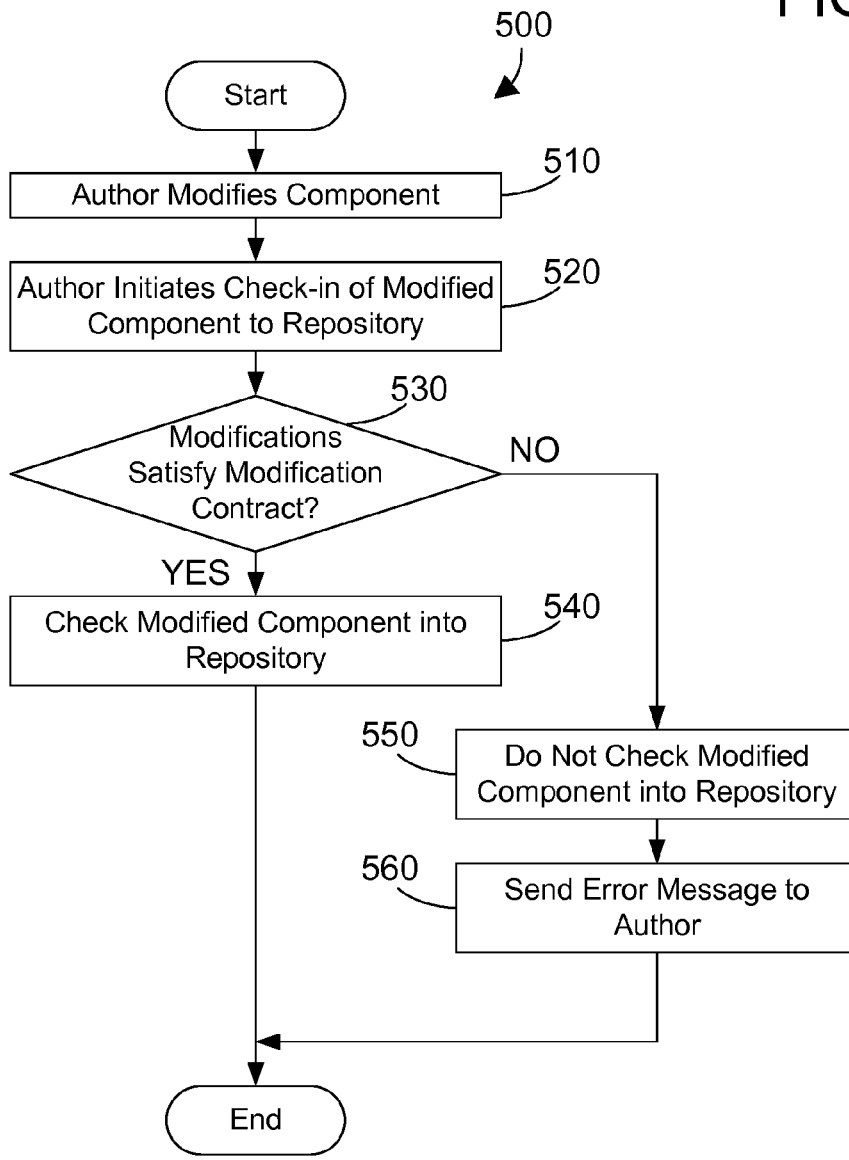

CONTROLLING MODIFICATION OF COMPONENTS IN A CONTENT MANAGEMENT SYSTEM

BACKGROUND

1. Technical Field

This disclosure generally relates to content management systems, and more specifically relates to modification of components in a content management system.

2. Background Art

Content management systems (CMSs) have been developed and allow many users to efficiently share electronic content such as text, audio files, video files, pictures, graphics, etc. Content management systems typically control access to content in a repository. An author (or user) may generate content, and when the content is checked into the repository, the content is available for reuse by other users. A user may also check out content from the repository, or link to content in the repository while generating content.

When a content management system is used in a controlled environment, it is desirable to control who can make changes to content. Known content management systems control access to content according to the role of the user who wishes to modify content. For example, a user who initially created content may be allowed to modify the content, or users with supervisor privileges may also be allowed to modify the content of other users. However, known content management systems do not dynamically adjust to allow or disallow modifications by users according to a user's past history in modifying content. Without a way for a content management system to dynamically adjust as users of a content management system gain experience, the current methods used to control access to content will provide a rigid and inflexible solution that requires a significant amount of administrator work to adjust privileges of authors as their experience in modifying content grows.

BRIEF SUMMARY

A content management system (CMS) includes a content modification mechanism that checks a modification contract corresponding to a component in the repository, and determines if one or more criteria in the modification contract are satisfied before making changes to the component. The content modification mechanism may include an author feedback mechanism, an author profile update mechanism, and a similarity policy. The author feedback mechanism provides messages to an author when the author attempts to modify a component in the repository. The author profile update mechanism allows automatically updating an author profile to reflect experience of the author, role of the author, and rank of the author, which may be dynamically updated based on the author's history in changing content in the past. The similarity policy may be defined that defines how similar a change must be to changes in previous versions of a component for the change to be allowed. The content modification mechanism determines if all relevant criteria in a modification contract for a component have been satisfied before allowing modification of the component. In this way the modification of components is controlled in a way that allows modification of components by those who are authorized yet restricts modifications by those who are not authorized.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 3 is a block diagram showing sample author criteria that could be used for an author;

FIG. 4 is a block diagram showing sample modification criteria that could be specified in a modification contract;

FIG. 5 is a flow diagram of a method for checking changes made by an author to a component in the repository before making the changes;

DETAILED DESCRIPTION

A content modification mechanism in a content management system controls who can modify content in the repository by specifying one or more modification contracts that correspond to one or more corresponding components in the repository of the content management system. When an author attempts to modify a component, the modification contract corresponding to the component is checked, and the author is allowed to modify the component only if one or more criteria specified in the modification contract are satisfied. An author profile corresponding to the author is dynamically adjusted over time according to the author's history and experience in correctly modifying content. In this manner, the content management system may effectively control modification of components in its repository in a dynamic way that accounts for experience of the author desiring to make a modification.

Figure 1:
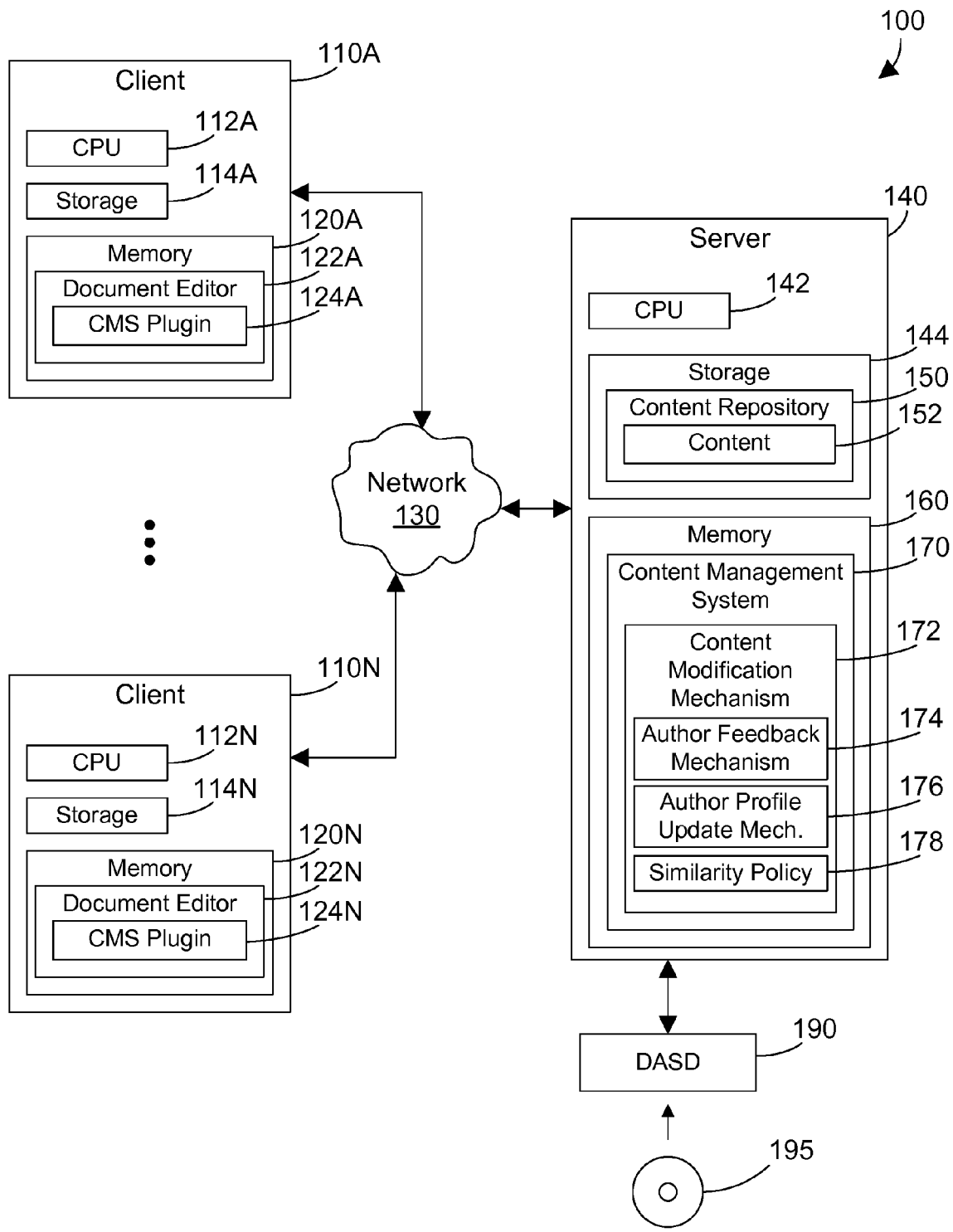
FIG. 1 is a block diagram of a networked computer system that includes a server computer system that has a content management system that includes a content modification mechanism that controls modification of components in a repository.

Referring to FIG. 1, networked computer system 100 includes multiple clients, shown in FIG. 1 as clients 110A, . . . , 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142. Computer system 140 also includes storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a content modification mechanism 172 that controls the modification of components in the content repository 150. Content modification mechanism 172 includes an author feedback mechanism 174, an author profile update mechanism 176, and a similarity policy 178. The author feedback mechanism 174 provides messages to an author. The author profile update mechanism 176 can automatically update an author profile to indicate the author's experience, role, and current rank, and may decrease the rank if the author makes mistakes in modifying content in the repository and may increase the rank as the author gains more experience or as the author avoids making mistakes in modifying content in the repository. The similarity policy 178 specifies one or more similarity criteria that determine whether a proposed change to a component is "similar" to former changes to other versions of the component or to similar components.

In FIG. 1, repository 150 is shown separate from content management system 170. In the alternative, repository 150 could be within the content management system 170. Regardless of the location of the repository 150, the content management system 170 controls access to and manages content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, ... , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as storage 144, main memory 160, and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The content management system may also be delivered as part of a service engagement with a client corporation, non-profit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
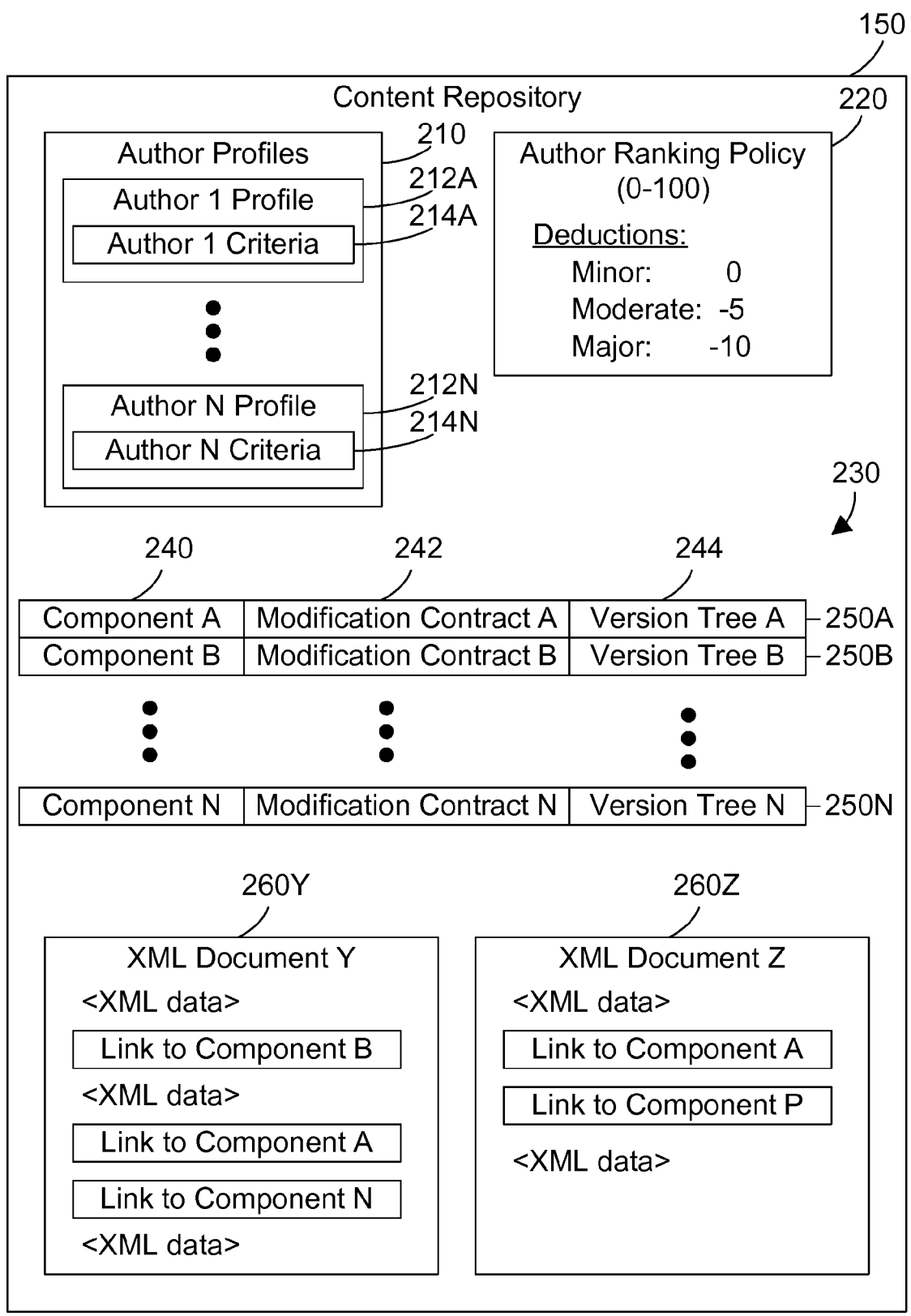
FIG. 2 is a block diagram showing details of the content repository 150 in FIG. 1.

Referring to FIG. 2, the content repository 150 in FIG. 1 is shown to include numerous items, including author profiles 210, an author ranking policy 220, a plurality of components 230, and documents 260Y and 260Z. Author profiles 210 include multiple profiles that each specifies author criteria. Thus, author 1 profile 212A has corresponding author criteria 214A, and possibly other author profiles through author profile N 212N with its corresponding criteria 214N. One suitable example for author criteria that may be specified in an author profile is shown at 214A in FIG. 3. The author criteria may include the role(s) of the author, the experience of the author, and the current rank of the author. The role of the author is preferably defined with respect to the author's role in the content management system. Thus, one user might be an author that is allowed to create new content, while another user may have a supervisor role that allows him or her to not only create new content, but to modify the content of others as well, as long as specified criteria for the change are satisfied. While the author criteria in FIG. 3 are shown as separate and discrete items, one skilled in the art will recognize that a suitable heuristic could use multiple criteria. For example, the current rank could be increased or decreased based on the role and experience of the author. The disclosure and claims herein expressly extend to any suitable author criteria in an author profile.

The author ranking policy 220 may include any suitable specification or heuristic for determining and adjusting author criteria in an author profile, such as author rank. For the sake of illustration, the author ranking policy 220 in FIG. 2 specifies no deduction from the author's rank if a modification that includes a minor error is made, specifies a five point deduction from the author's rank if a modification that includes a moderate error is made, and specifies a ten point deduction from the author's rank if a modification that includes a major error is made. The author ranking policy 220 thus provides the criteria for the author profile update mechanism 176 in FIG. 1 to dynamically monitor modifications to content made by authors and automatically adjust the rank of the author according to those modifications. Note the author ranking policy could include other criteria not shown in FIG. 2. For example, the rank of an author could be automatically increased if no errors were made or if only minor errors were made for a predetermined period of time. In this manner the author profile update mechanism 176 can adjust the rank of an author up and down according to the trust level of the author as indicated by the author profile. This dynamic adjustment of author profile allows greater flexibility in monitoring and making modifications to content in the repository.

Components 230 in FIG. 2 are shown to include a component portion 240, a modification contract 242, and a version tree 244. The component portion 240 includes the component itself. The modification contract 242 specifies one or more modification criteria 410 as shown in FIG. 4. The modification criteria 410 may include any suitable criteria, including the rank of who is allowed to update, the version information, and a similarity measure. The rank of who can update specifies a required rank for performing an update. The version information specifies the current version of the component. The similarity measure specifies how close a change must be to previous changes to the component itself, to previous versions of the component, or to similar components. Specific examples of modification criteria will be discussed in more detail below with reference to FIG. 8. The version tree 244 shows all previous versions of the component, and may also indicate related components as well.

Components 230 in FIG. 2 are shown to include a first entry 250A, a second entry 250B, . . . , to an Nth entry 250N. Also shown in FIG. 2 are extensible markup language (XML) documents 260Y and 260Z. Note that documents 260Y and 260Z are also components that are stored in the repository, but are compound components because they include links to other components in the repository. Thus, document 260Y includes a link to Component B, a link to Component A, and a link to Component N. Document 260Z includes a link to Component A and a link to Component P.

Referring to FIG. 5, a method 500 shows suitable high-level functions of the content modification mechanism 172 in FIG. 1. First an author modifies content (step 510). This may be done, for example, by checking a component out of the repository and modifying the component in an editor. The author initiates check-in of the modified component to the repository (step 520). If the modifications satisfy the modification contract for the modified component (step 530=YES), the modified component is checked into the repository (step 540). If the modifications do not satisfy the modification contract (step 530=NO), the modified component is not checked into the repository (step 550) and an error message is sent to the author (step 560) indicating the requested modification was not made. Note the error message in step 560 is preferably sent using the author feedback mechanism 174 in FIG. 1. At this point, method 500 is done.

Figure 6:
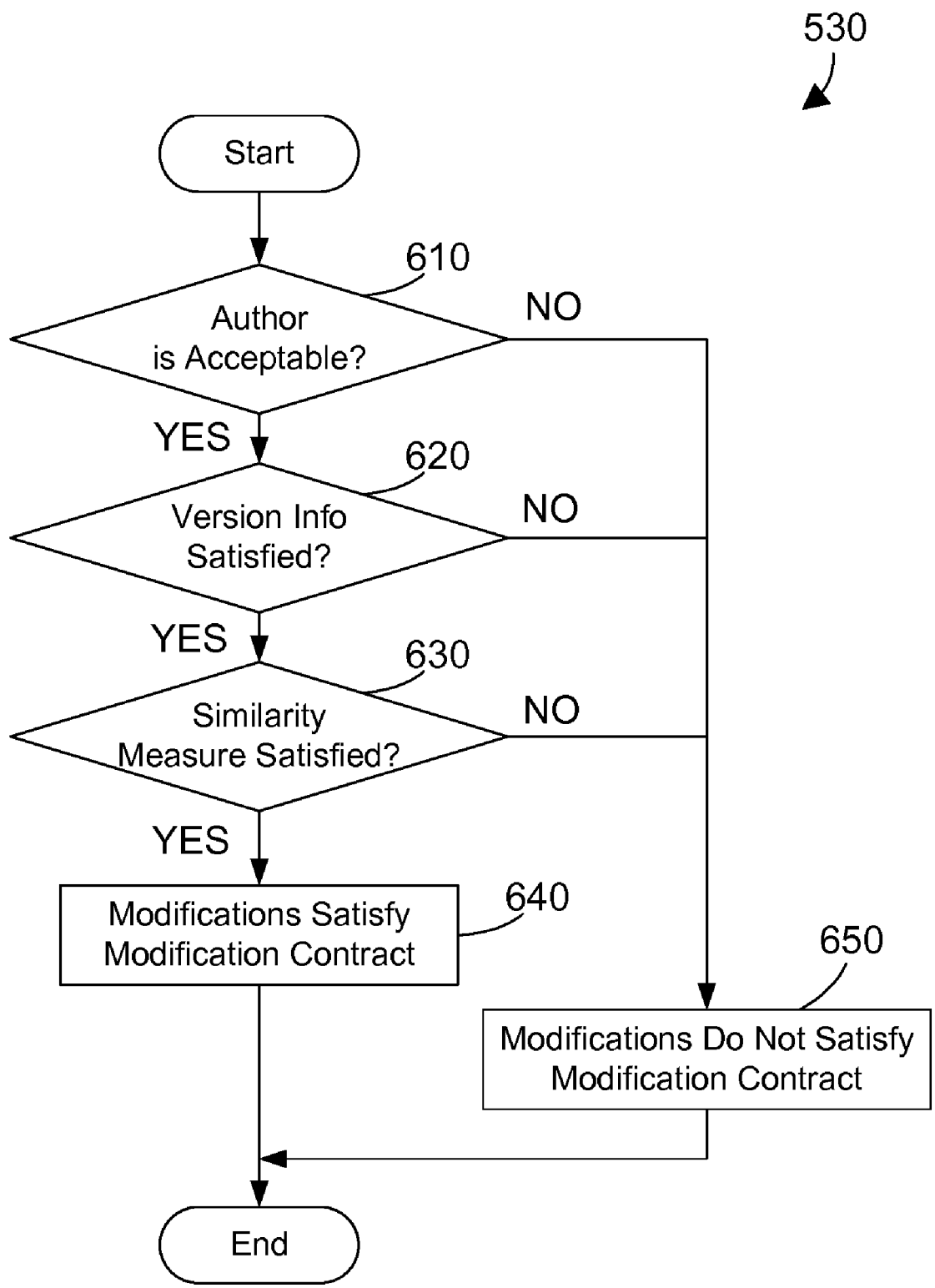
FIG. 6 is a flow diagram of one specific implementation for step 530 in FIG. 5.

Referring to FIG. 6, a method 530 is one suitable implementation for step 530 in FIG. 5. If the author is acceptable (step 610=YES), and the version information is satisfied (step 620=YES), and the similarity measure is satisfied (step 630=YES), the modifications by the author satisfy the modification contract (step 640). If the author is not acceptable (step 610=NO), or if the version information is not satisfied (step 620=NO), or if the similarity measure is not satisfied (step 630=NO), the modifications by the author do not satisfy the modification contract (step 650). Note a modification contract may not include all three criteria represented by steps 610, 620 and 630 in FIG. 6. If one or more of these criteria are not specified in the modification contract, we assume for the purposes of FIG. 6 that these criteria are satisfied.

Figure 7:
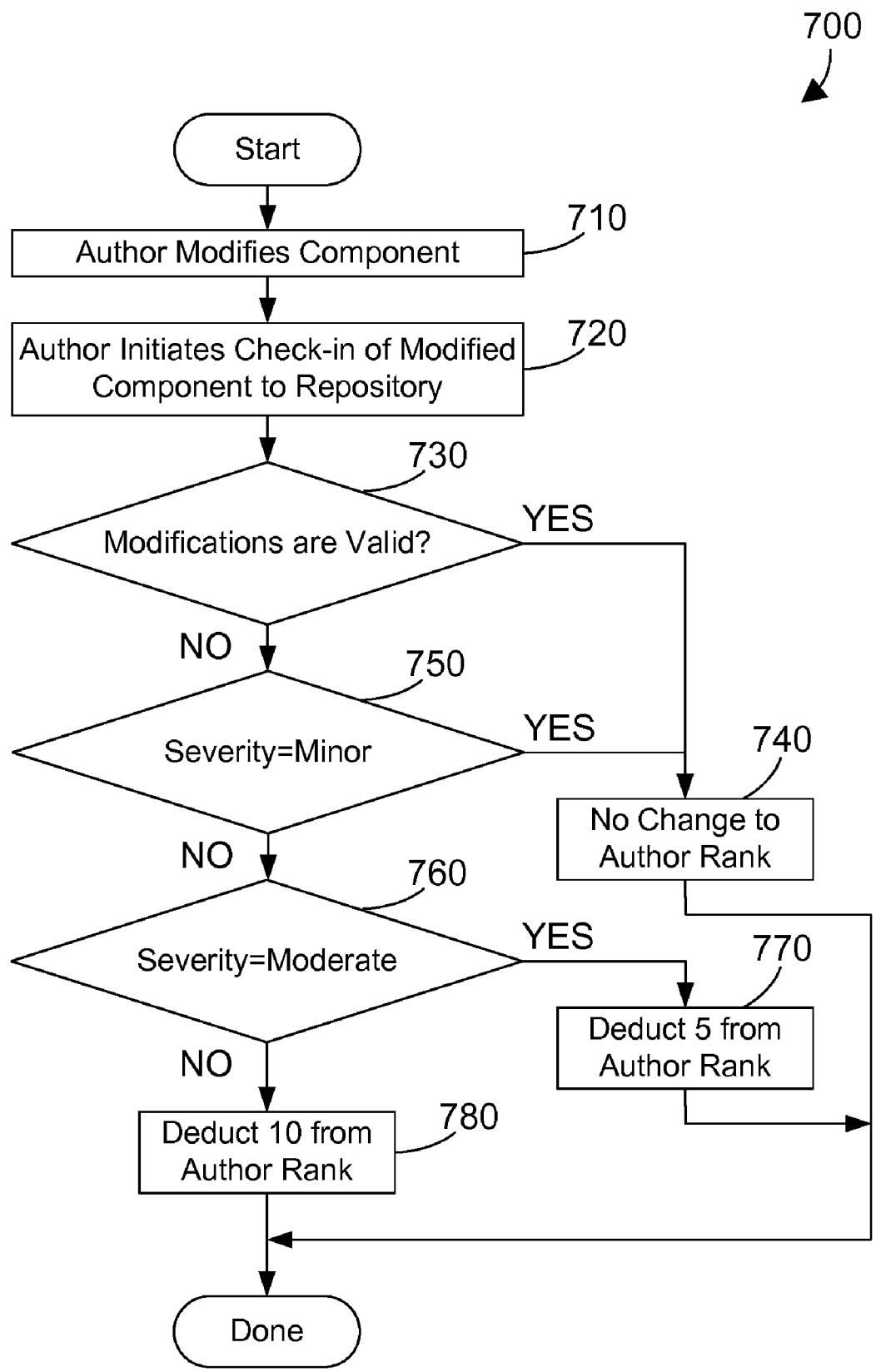
FIG. 7 is a flow diagram of a method for automatically adjusting a rank of an author when the author makes invalid modifications to content in the repository.

Referring to FIG. 7, a method 700 represents a sample method that could be performed by the author profile update mechanism 176 in FIG. 1 to implement the author ranking policy 220 in FIG. 2. First, an author modifies a component (step 710). The author initiates check-in of the modified component to the repository (step 720). If the modifications are valid (step 730=YES), there is no change to the author rank (step 740). If the modifications are not valid (step 730=NO), but the severity of the error is minor (step 750=YES), no change is made to the author rank (step 740). If the modifications are invalid (step 730=NO), and the severity is not minor (step 750=NO) and the severity is moderate (step 760=YES), five points are deducted from the author rank (step 770). If the severity is not moderate (step 760=NO), this means the severity is high, so ten points are deducted from the author rank (step 780). While method 700 does not show a way to increase the rank of an author, the author profile update mechanism 176 can also increase the rank of an author using any suitable criteria or heuristic. For example, if the author has no errors or only minor errors for a predetermined period of time, the author's rank could be increased. If a supervisor provides a favorable evaluation of an author, the author's rank may be increased. The disclosure and claims herein expressly extend to any suitable criteria or heuristic for adjusting the rank of an author. In addition, while criteria are not defined herein for determining whether the severity of an invalid change is minor, moderate or high, one skilled in the art will recognize there are numerous ways to define the severity of an invalid change, and the disclosure herein expressly extends to all suitable ways to define severity of an invalid change, whether currently known or developed in the future.

Figure 8:
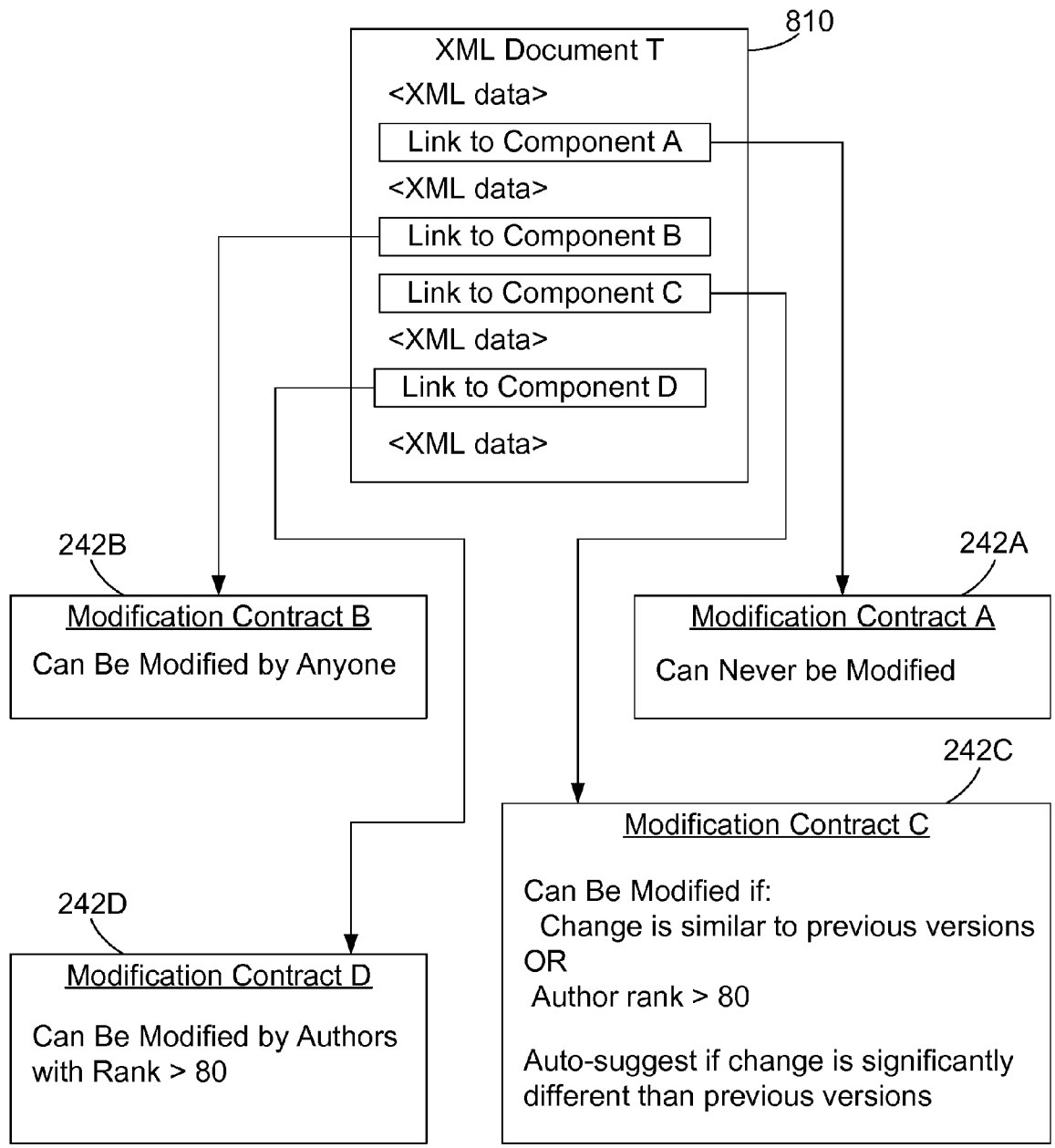
FIG. 8 is a block diagram of a sample document that includes links to four components with corresponding modification contracts for each component for illustrating the concepts disclosed herein.

Referring to FIG. 8, an example is now shown to illustrate many of the concepts discussed herein. A compound document 810 is shown to include links to four different components A, B, C and D. The modification contracts for each of these components are shown in separate boxes connected to the component links with a line. Thus, the link to component A is shown with a line to the modification contract 242A for component A. In similar fashion, each link to components B, C and D in document 810 has a line pointing to the corresponding modification contracts 242B, 242C and 242D, respectively, for each of the components.

Modification contract 242A indicates component A can never be updated. For example, a component that has been used in a released product may be locked by the modification criteria (as in 242A in FIG. 8) to assure the component never changes. Modification contract 242B indicates component B can be modified by any author. Modification contract 242C indicates component C can be modified if the proposed change is similar to previous versions, or if the author rank is over 80. Modification contract 242C additionally indicates to auto-suggest if the change is significantly different than previous versions. Auto-suggest is a known method in content management systems for prompting an author with recommended values when modifying a component. Modification contract 242D specifies component D can be modified by authors with a rank over 80.

With the example shown in FIG. 8, we assume an author ranking policy as shown at 220 in FIG. 2, and an author profile for a selected author specifies a rank of 80 for that author. We then assume the selected author attempts to make an invalid change to the document 810 shown in FIG. 8, and the mistake is a moderate one. As a result, the author profile update mechanism deducts five points from the author's rank, resulting in a rank of 75 for the author (see method 700 in FIG. 7). We next assume the author attempts to modify component D. However, the modification contract 242D corresponding to component D specifies this component can be modified only by authors with a rank over 80. Because the selected author's current rank is 75, the author's rank does not satisfy the modification contract. As a result, the requested change to component D is not made, and a message is sent to the author indicating the requested change was not made.

Now we assume the selected author attempts to modify component C. The modification contract 242C indicates component C can be modified if the change is similar to previous versions, or the author rank is over 80. The author's current rank is 75, which is not sufficient by itself. However, we assume for this example the author's proposed changes are similar to changes to the previous versions of the component, so the author's proposed changes are allowed. This means the proposed change satisfies both the similarity measure specified in the modification contract (e.g., 242 in FIG. 4) and the similarity policy 178 shown in FIG. 1.

We assume the author then attempts to modify component C with changes that are significantly different than changes to previous versions of the component. In this case, the change is not similar to the previous versions, and the author rank is 75, which is less than the 80 required. As a result, the modification is not allowed, but a proposed change is auto-suggested to the author by sending the author a message indicating changes that would be similar enough to previous versions of the component to be acceptable according to the modification contract 242C. The author can examine the changes that were auto-suggested, then determine whether or not to make one or more of the recommended changes.

The simple example in FIG. 8 is presented to illustrate several of the concepts discussed and claimed herein, but it is very simplified for the purpose of illustration. One skilled in the art will recognize that many different criteria could be specified in a modification contract for a component, other criteria could be specified in the author profiles, and other suitable changes could be made within the scope of the disclosure and claims herein.

The content management system disclosed and claimed herein allows controlling modification of content in a content management system using a modification contract corresponding to a component to be changed and using a specified profile of the author. The author profile is dynamically adjusted according to changes the author makes and/or attempts to make to content in the repository. When an author's proposed changes satisfy a modification contract corresponding to the component to be changed, the change is allowed. Otherwise, the change is not allowed and a message is sent to the author indicating the change was not allowed.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, the disclosure and claims herein expressly extend to content management systems that handle any suitable type of content, whether currently known or developed in the future.

What is claimed is:

1. A computer-implemented method for a content management system that manages a plurality of components in a repository to control modifications to the plurality of components, the method comprising the steps of:
   (A) storing in the repository version information corresponding to at least one of the plurality of components;
   (B) storing in the repository a plurality of modification contracts that each correspond to a component in the repository, each modification contract including:
      a. a specification of rank of an author that is required for the author to modify the corresponding component;
      b. a version specification that specifies at least one other version of the corresponding component to examine for changes; and
      c. a similarity measure for modifying the corresponding component that specifies how similar a proposed modification must be according to past modifications;
   (C) storing a plurality of author profiles in the repository, each author profile specifying a rank for a corresponding author;
   (D) automatically increasing rank of an author in the corresponding author profile when the author makes at least one valid modification to at least one of the plurality of components in the repository;
   (E) automatically increasing rank of the author in the corresponding author profile when the author makes no invalid modifications or only minor invalid modifications to at least one of the plurality of components in the repository for a predetermined time period;
   (F) automatically decreasing rank of the author in the corresponding author profile when the author makes at least one invalid modification to at least one of the plurality of components in the repository;
   (G) the author requesting to modify a selected component in the repository;
   (H) determining from the modification contract and from a rank of the author in the author profile whether the at least one modification criterion in the modification contract allows the author to modify the selected component;
   (I) if the modification contract and the rank of the author in the author profile allow the author to modify the selected component, making the modification requested in step (G); and
   (J) if the modification contract and the rank of the author in the author profile do not allow the author to modify the selected component, sending a message to the author indicating the modification was not allowed.

* * * * *